June 5, 1956  C. W. TASKER  2,748,596
RUPTURE TESTER

Filed Nov. 19, 1951  2 Sheets-Sheet 1

INVENTOR.
CLINTON W. TASKER
BY
Carl A. Castellan
ATTORNEY.

June 5, 1956  C. W. TASKER  2,748,596
RUPTURE TESTER

Filed Nov. 19, 1951  2 Sheets-Sheet 2

INVENTOR.
CLINTON W. TASKER
BY
Carl A. Castellan
ATTORNEY.

:::
United States Patent Office 2,748,596
Patented June 5, 1956

2,748,596

RUPTURE TESTER

Clinton W. Tasker, Nether Providence Township, Delaware County, Pa., assignor to American Viscose Corporation, Philadelphia, Pa., a corporation of Delaware Application November 19, 1951, Serial No. 257,010

10 Claims. (Cl. 73—12)

The present invention relates to equipment for conditioning and testing samples of sheet materials and particularly films, such as cellophane, and other thin-gauged packaging materials with respect to their resistance to rupture over a wide range of temperatures when subjected to a force produced by impact.

A principal object of the present invention is to provide an apparatus for testing the rupture strength of such sheet materials by the impact of a single freely falling body. It is also an object to control the temperature at which the testing is carried out at any selected temperature within a range including at least the lowest and highest temperatures reached by the earth's atmosphere. It is still another object to provide equipment in which the samples may be fully prepared for testing by storing the samples therein prior to the impact determination until they are at equilibrium with the conditions prevailing within the appaartus prior to and during the testing thereof. Other objects, features and advantages will be apparent from the following description and the drawing relating thereto in which Fig. 1 is a plan view in section of apparatus in accordance with the invention taken along line I—I of Fig. 2;

Briefly stated, the invention concerns an apparatus for testing samples of sheet materials whereby the resistance of samples to rupture by impact may be ascertained under predetermined atmospheric conditions, particularly with respect to any temperature selected from a wide range of temperatures. The apparatus comprises a chamber or container substantially enclosed from the atmosphere, an apertured sample-holder which firmly and continuously engages both sides of a sample along surfaces surrounding a central section of the sample exposed by the aperture of the holder, metallic balls or other elements of substantial density which may be dropped onto the exposed section of the sample, structure for supporting and releasing the impact element from a predetermined point over the sample, the chamber having an aperture and a closure therefor directly over the exposed section of the sample, and a system for producing and maintaining a heated or a chilled atmosphere at substantially constant temperature within the chamber. The apparatus is constructed to provide space for storing and conditioning samples prior to being tested, to discharge elements or balls dropped into the chamber, and to facilitate the defrosting of the chamber after being operated at freezing temperatures.

Figure 1:
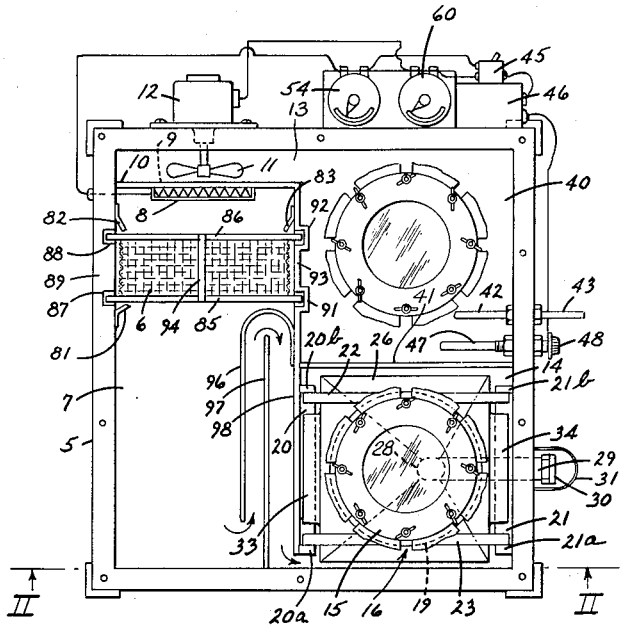
Figure 2:
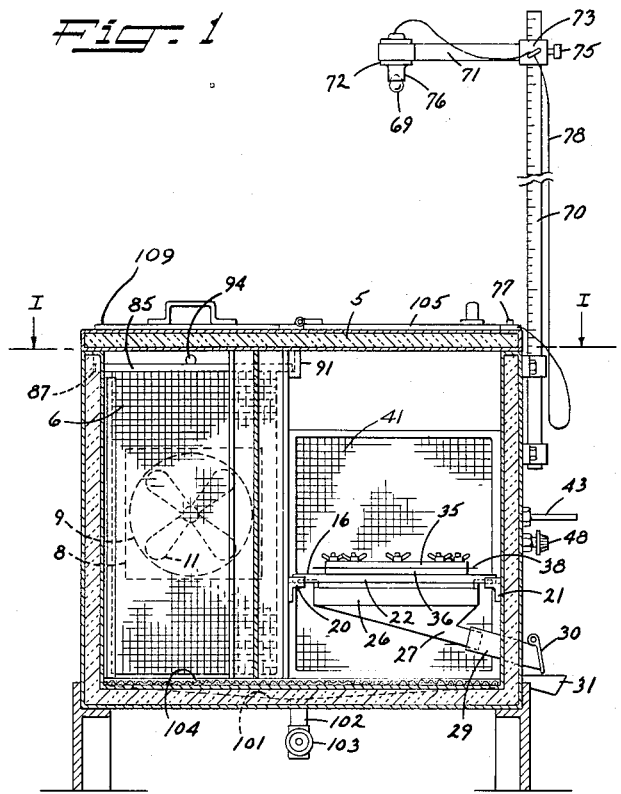
Fig. 2 is an elevation in section taken along line II—II of Fig. 1.
Figure 5:
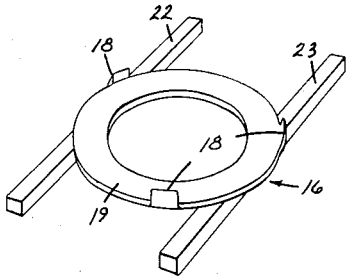
Fig. 5 is a pictorial view of a rack member of the apparatus adapted for supporting a sample holder.
Figure 3:
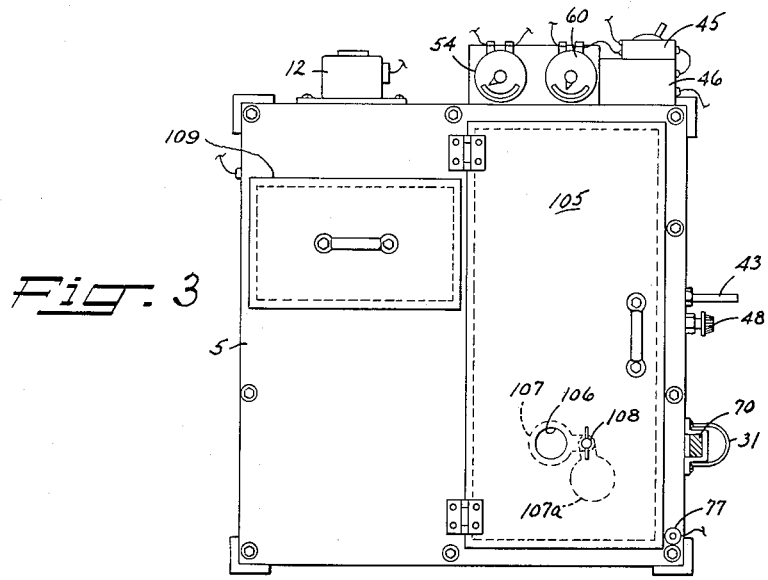
Fig. 3 is a top view of the apparatus with some of the appending parts removed.

Figs. 1 to 3 are various views of the apparatus of which essential portions are a multiple-compartment container 5, a basket 6 for supporting the cooling medium within the compartment or chamber 7, a heater 8 mounted over an aperture 9 extending through a baffle 10, and a fan 11 driven by a motor 12. The fan is supported adjacent the aperture to discharge air currents through the aperture. The fan 11 is supported within a compartment or corridor 13 along which the air which the fan discharges through the aperture may pass. Such currents are forced by the fan through the heater 8 and the basket 6. In another compartment 14 of the container, a sample holder 15 is supported on a rack 16 illustrative of the many arrangements possible for supporting the holder during testing. Both the holder and rack are loosely supported within the container. However, the holder is positioned on the rack by upwardly-extending boss portions 18 of the annular element 19 of the rack which engage the peripheral edge of the holder 15. The rack is positioned to a predetermined position within the chamber 14 as a result of its resting on shelves 20 and 21 and the engagement of upwardly-projecting positioning elements 20a, 20b of the shelf 20 and elements 21a, 21b of the shelf 20 with the parallel members 22 and 23 of the rack. The shelves 20 and 21 also support a receiver or tray 26 positioned underneath the rack 16 to receive an impact element such as a metallic ball dropped through the holder 15. The bottom or floor of the tray is contoured downwardly from its lateral extremities toward an aperture 28 through the bottom. A tubular extension 27 contiguous with the aperture 28 extends into the end portion of a chute or duct 29 disposed within the container. The duct 29 extends through the wall of the container and terminates exteriorly thereof in a closure 30 which may be hinged to the duct as shown. A small receiver 31 is mounted on the exterior of the container to receive balls which pass out of the container through the duct 29. After the rack 16 is removed from the container 5, the tray 26 is also readily removed therefrom since it has marginal extensions 33 and 34 which seat on the shelves 20 and 21.

Figure 6:
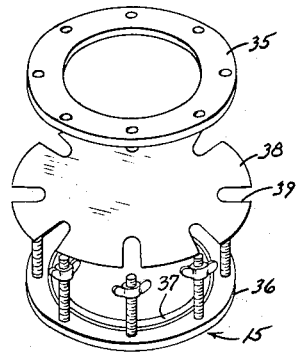
Fig. 6 is an exploded pictorial view showing a sample and parts of a sample holder.

The holder 15 comprises, as shown in Fig. 6, a pair of flat ring members 35 and 36. A resilient washer 37 is secured along one of the opposing surfaces of one of the members to promote continuous engagement of a sample 38 of sheet material (also shown in Fig. 6) placed between the ring members. A plurality of bolts having wing nuts 39 extending through the ring members enable the members to be drawn tightly into engagement with the sample 38 which has indentations or slots 39 corresponding to the bolts of the holder. These indentations may be easily formed by a stamping process involving the use of suitably contoured dies.

A plurality of samples may be prepared and conditioned prior to testing by securing each one within a separate holder such as that illustrated in Fig. 6 and stacking such a plurality of holders and samples within a compartment 40 of the container. The temperature control system for the apparatus may then be operated at the desired testing temperature for a period such as to obtain thorough thermal and moisture equilibrium of the samples with the atmosphere within the apparatus. After such a period, a holder and the sample secured therewithin may be transferred to the rack 16 in the compartment 14. The screen 41 which separates compartments 14 and 40 is preferably constructed so as not to completely separate the compartments and, as shown, does not extend completely to the top of the compartments. The aperture provided thereby facilitates the transfer of samples from one compartment to the other without exposure to atmosphere outside the apparatus. If preferred, the screen 41 may extend to the top of the compartments if suitably apertured to facilitate the transfer of holders from one compartment to the other, the aperture being located preferably to prevent passage of sample fragments, balls, etc., from the testing chamber. The openness of the screen and the aperture thereabove permit circulated air or other gaseous medium discharged into the compartment 14 from the compartment 7 to pass readily into the compartment 40. The air or other gaseous medium received by the compartment 40 for conditioning the samples stored therein may then pass into the corridor 13 to be recirculated by the fan 10.

In controlling the temperature of the atmosphere within the apparatus of the present invention to a desired level, air is forcibly and intermittently passed over a cooling medium when the temperature of testing required is below existing room temperature. When the testing temperature is above room temperature, air is circulated in contact with an intermittently operated heating device. The temperature controlling system thus operates somewhat differently in these two situations in accordance with the setting of a control switch 45 hereinafter described in detail.

When testing is to be carried out at a lower temperature than that of the atmosphere, the fan 11 is operated intermittently in response to the operation of a relay 46. The relay 46 is energized by a circuit which is opened and closed by a heat-sensitive switch within a unit 47 which extends into the chamber 40 from the exterior of the container. To facilitate the checking of the accuracy of the temperature controlling system of the apparatus, a thermometer well 42 is provided which extends through the container wall into chamber 40 adjacent the switch unit 47. The thermometer well is secured to the wall and has its entrance disposed exteriorly of the container for receiving the thermometer 43.

Figure 4:
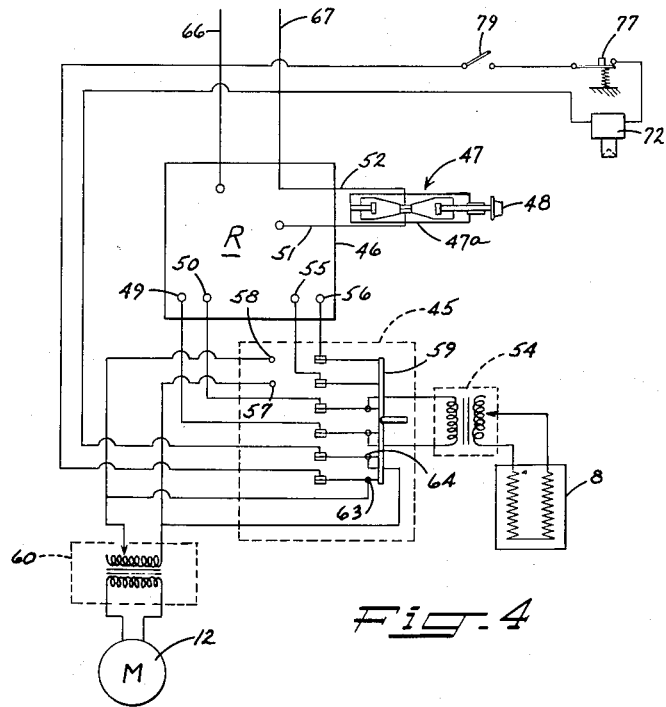
Fig. 4 is a diagram of a circuit for energizing the various electrical portions of the apparatus.

For the purposes of the present invention, the unit 47 may comprise a switch, such as switch 47a shown diagrammatically in Fig. 4, which remains closed below a control temperature but opens as the temperature rises above the control temperature. Although heat-sensitive switches of different designs are available from various manufacturers and satisfactory for controlling the relay 46, the switch unit 47 employed in the present apparatus is that manufactured by Fenwall Incorporated and sold under the code number A9646-A. Such a unit has a control knob 48 which may be turned to obtain settings corresponding to various control temperatures. Such a switch is satisfactory for obtaining high as well as low temperatures when used with a commercially available relay such as the model manufactured by the Fisher Scientific Company and identified as "Electronic Relay No. 13-991." A relay 46 of this general type has, as shown in Fig. 4, one pair of power supplying terminals 49 and 50 from which power is available when the switch 47a is closed. An electrical device connected with the terminals 49 and 50 will then be energized when the control circuit for the relay comprising connectors 51 and 52 and the switch unit 47a becomes energized with the closing of the switch 47a. As shown, the outlet terminals 49 and 50 are connected with the portion of the switch 45 which connects the relay with an adjustable transformer 54 having its secondary windings connected with the heater 8.

The relay 46 has another set of terminals 55 and 56 from which power is available to an electrical device connected therewith when the circuit including the switch 47a is open. This is the reverse situation of that just described. The terminals 56 and 57 are capable of supplying power at the times power is not available from terminals 49 and 50. Terminals 55 and 56 are connected to that portion of the switch 45 which makes connection with terminals 57 and 58 when the knife member 59 comprising movable contact elements (six shown) of the switch is moved to the left. Terminals 57 and 58 are connected with the fan motor 12 through an adjustable transformer 60. The fan may be energized through terminals 63 and 64 of the switch 45 directly from the main supply conductors 66 and 67 when the movable contact member 59 of the switch 45 is thrown to the right. Therefore, in the left position of the switch 45, the fan works intermittently by being connected with the relay during times when the control circuit thereof is open. This position of the switch 45 is used to obtain testing temperatures below that of the atmosphere. The motor 12, however, works continuously when test temperatures are employed above that of the atmosphere (corresponding to the rightward position of the switch 45) and the heater, being energized from the terminals 49 and 50, generates heat intermittently during the periods when the control circuit including the switch 47 is closed.

As shown in Fig. 2, the apparatus of the invention includes structure for supporting and positioning a magnetically-sensitive element of any shape adapted for imparting an impact force to the sample, such as a ball 69, prior to being dropped into the container 5. Such structure comprises an upright post 70 preferably marked off with indicia to indicate the height of the ball 69 from a holder 15 and a sample 38 held thereby within the chamber 14. The ball 69 is held at the indicated height by an adjustable support comprising an arm 71 and an electromagnet 72 fastened to the arm. The arm has an apertured or slotted portion 73 through which the upright member 70 extends in relatively slidable relationship. The support may be secured at any desired elevation above the container 5 through the use of a set screw 75. The magnetically-sensitive core 76 of the electromagnet is provided with a conical recess in its lower end which may be utilized to receive and center balls of different diameters along a vertical path extending from the center of the circular exposed area of the sample 38. To release the ball, the electromagnet may be deenergized by pressing a button switch 77 which opens the circuit carried by an electrically conductive cord 78. As shown in Fig. 4, the circuit for the electromagnet 72 comprises a switch 79, in addition to the button switch 77, which need be closed only during the testing period.

When operating the apparatus at temperatures below room temperature, a refrigerant, such as Dry Ice, is found to be a highly satisfactory medium for cooling the atmosphere within the container 5. As the absorption of heat resulting from sublimation of the Dry Ice is dependent primarily upon the transfer of air over the surface of the Dry Ice, the fan 10 is operated intermittently from the relay 46. The Dry Ice is preferably supported within a perforate container providing extensive contact of circulated air with the contents thereof. Preferably, the basket 6 extends substantially between the top and bottom of the compartment 7 and substantially between opposite walls of the compartment so as to insure efficient contact of the circulated air with the Dry Ice. As Dry Ice is generally obtained in block form, it is preferably broken up into lumps of ½ to 2 inches thick. Lumps of this size permit satisfactory cooling of the air but do not excessively inhibit the circulation thereof through the container 5. If desired, vertical baffles 81, 82 and 83 attached to vertical interior surfaces of the apparatus may be provided for aiding in positioning the basket and promoting the contact of the air with the Dry Ice.

As shown, the basket is provided with upper reinforcing elements or rods 85 and 86 which extend along upper edges of upper sides of the basket into depressions or recesses 87 and 88 of the wall 89 of the container and recesses 91, 92 of a baffle 93. A handle for the basket may be provided, as shown, by a rod-like element 94 which extends between the elements 85 and 86. The element 94 is connected to elements 85 and 86 as by welding. If preferred, however, the basket 6 may be supported within the chamber 7 by shortening the elements 85 and 86 and dispensing with the recesses 87, 88, 91, 92 and allowing the basket to rest on the bottom of the chamber 70.

The chamber 7 is separated from the chamber 14 by a series of baffles 96, 97, 98, arranged in interdigital, substantially overlapping relationship, which force the air passing through the basket 6 to traverse a tortuous path defined by the extensive surfaces of the baffles. These baffles of substantial area are provided primarily to collect moisture in the form of frost from refrigerated air.

The container 5 has a floor defined by the surface 101 which is inclined from the inner surfaces of the walls of the container 5 toward the center of the floor. The lowest portion of the floor is apertured and a duct 102 extends contiguously with the aperture downwardly and exteriorly of the container to terminate in a valve 103 which is opened whenever the interior of the container is defrosted. The actual working floor of the apparatus, however, comprises a heavy planular horizontal screen 104 which is supported by the surface 101 along its higher portions near the walls of the container 5. The screen, of course, is spaced above substantially all of the surface 101.

Access is provided simultaneously to chambers 14 and 40 by an approximately horizontal door or hinged closure 105 so that a sample and its respective holder may be quickly transferred from chamber 40 to a position for testing in chamber 14 without substantial dilution of the atmosphere within the apparatus. The opportunity for dilution is greater when testing at temperatures above room temperature; if appreciable temperature change is indicated by the thermometer 43, testing of the sample may be delayed a minute or so to enable the temperature control system to make the required temperature adjustment. The door 105 has an aperture 106, through which the ball 69 is dropped into the chamber 14. The aperture is normally maintained closed, except at the time the ball is released, by a pivotable closure 107 in preferably slidable contact with the lower surface of the door. The closure pivots to the position 107a, shown in dotted outline, to permit passage of the ball into the chamber by turning a handle 108. Another lid or closure 109 is provided in the top portion of the container to facilitate the loading or the removal of the basket 6. The various compartments into which the interior of the container is divided are defined with respect to their lateral limits by partitioning means comprising the baffle 10, baffle 93, baffles 96, 97, and 98, and the screen 41. Such partitioning means are apertured and arranged to direct, when the top portion of the container is in place, the gaseous medium propelled by the fan in an endless path extending progressively through the compartments.

The present invention is very useful in evaluating the properties of packaging materials, particularly in view of present vigorous efforts to improve such materials to meet the requirements of the Armed Forces which arise in suitably packaging goods for shipment to areas involving all conceivable climates. The apparatus hereinabove described is adapted to condition samples and to facilitate the transfer thereof from a conditioning station to a test station at any temperature within the range encountered in the earth's climate without exposure of such samples to room temperature. Moreover, the present apparatus is very simple and convenient to operate and provides a system for carrying out the tests contemplated under highly standardized conditions.

While a preferred embodiment of the invention has been shown and described, it is to be understood that changes and variations may be made without departing from the spirit and scope of the invention as defined in the appended claims.

I claim:

1. Testing apparatus for sheet material comprising an unattached clamp assembly, a hollow container which is substantially closed from the atmosphere, an impact element, means for supporting the impact element above the container in alignment with a path of free fall into the container, the container having a normally closed opening along said path adapted to be opened for admitting the impact element during its free fall, and means for circulating a gaseous medium within the container; said clamp assembly having members for engaging opposite sides of a sample of the sheet material whereby the sample is held in a plane, the assembly having an aperture for exposing both sides of a central section of the sample; partition means mounted in the container for dividing it into a plurality of compartments, the partition means permitting the gaseous medium discharged by the circulating means to pass progressively through said compartments; and means in one of the compartments for supporting a refrigerant; and means in another of the compartments for positioning said clamp assembly under said opening with its aperture approximately centered with respect to the path; another of said compartments serving as a depository for storing a plurality of other clamp assemblies, the circulating means being mounted in one of said plurality of compartments.

2. Testing apparatus for sheet material as defined in claim 1 wherein said partition means is disposed and arranged to direct a gaseous material discharged by the circulating means along an endless path extending through the compartments and the circulating means.

3. Testing apparatus for sheet material as defined in claim 1 wherein said aperture is approximately centered with respect to said path of free fall and is larger than the largest horizontal cross section of the impact element when oriented for descending along said path.

4. Testing apparatus for sheet material as defined in claim 1 comprising a receiver for the impact element supported in the compartment designated for receiving said assembly below the normal position of the assembly in the compartment, the container having an opening disposed generally below the receiver, and closure means for closing the opening, the floor of the receiver extending downwardly into communication with said opening whereby an element dropped into the receiver may pass by gravity through the opening to a region outside of the container.

5. Testing apparatus for sheet material as defined in claim 1 wherein the bottoms of the compartments are defined by a perforated false floor, the container having a floor extending underneath the false floor which slopes downwardly toward a normally closed opening.

6. Testing apparatus for sheet material as defined in claim 1 wherein the means for supporting the impact element above the container comprises electro-magnetic means, and an electrical circuit for energizing the electro-magnetic means comprising a switch for opening the circuit whereby the element may be released by the electro-magnetic means.

7. Testing apparatus for sheet material as defined in claim 1 wherein the clamp assembly comprises flat members adapting the assembly to be neatly stacked with a plurality of others one on top of the other, and said compartment for receiving a plurality of such assemblies being arranged for the stacking of said assemblies.

8. Testing means for sheet material as defined in claim 1 comprising means for controlling the temperature of a gaseous material enclosed within the container comprising a fan as said circulating means, and heating means supported adjacent the fan, said fan being positioned and aligned to force the gaseous material into contact with the heating means and to discharge it along an endless path extending progressively through said plurality of compartments.

9. Testing means for sheet material as defined in claim 1 wherein the circulating means is so disposed as to direct the gaseous material being circulated first through the chamber for containing the refrigerant and then into the chamber for supporting said clamp assembly under said opening, the portion if said partition means which separates said two chambers comprising a series of baffles arranged in interdigital spaced relationship to provide a surface along said path of the gaseous material whereon moisture may be deposited.

10. Testing apparatus for sheet material as defined in claim 1 wherein the circulating means is a fan, automatic means cooperating wtih said fan for controlling the temperature of the gaseous medium enclosed within the chamber comprising an electrically controlled driving means for the fan, and electrical heating means positioned adjacent the fan within the path of its propulsion of said gaseous medium, control means responsive to the temperature of said medium, said control means being electrically connected with said driving means and the heating means and responsive to a predetermined temperature below that of atmospheric to energize the fan as the temperature within the container rises above said predetermined temperature, said control means being responsive to a predetermined temperature above that of atmospheric to energize the fan and the heating means as the temperature of the medium descends to the latter-named predetermined temperature.

References Cited in the file of this patent

UNITED STATES PATENTS

| | | |
|---|---|---|
| 1,709,638 | Thwing | Apr. 16, 1929 |
| 2,002,552 | Scott | May 28, 1935 |
| 2,264,412 | Shindel | Dec. 2, 1941 |
| 2,377,590 | Talalay | June 5, 1945 |
| 2,404,584 | Liska et al. | July 23, 1946 |
| 2,469,013 | Sobota | May 3, 1949 |
| 2,491,512 | Moore | Dec. 20, 1949 |
| 2,579,503 | Lubin et al. | Dec. 25, 1951 |